April 25, 1961

L. PÉRAS 2,981,232

DIFFERENTIAL PRESSURE PNEUMATIC JACKS
ADAPTED FOR AUTOMATIC RETURN
TO INITIAL POSITION

Filed April 1, 1958

INVENTOR.
LUCIEN PERAS
BY
ATTORNEY.

April 25, 1961

L. PÉRAS 2,981,232

DIFFERENTIAL PRESSURE PNEUMATIC JACKS
ADAPTED FOR AUTOMATIC RETURN
TO INITIAL POSITION

Filed April 1, 1958

INVENTOR.
LUCIEN PERAS

BY
ATTORNEY

United States Patent Office 2,981,232
Patented Apr. 25, 1961

2,981,232

DIFFERENTIAL PRESSURE PNEUMATIC JACKS ADAPTED FOR AUTOMATIC RETURN TO INITIAL POSITION

Lucien Péras, Billancourt, France, assignor to Regie Nationale des Usines Renault, Billancourt, France, a French works Filed Apr. 1, 1958, Ser. No. 725,619

Claims priority, application France Apr. 10, 1957

11 Claims. (Cl. 121—38)

The present invention relates in general to differential pressure pneumatic jacks and has for its essential object to improve the design of devices of this character. More particularly, contrary to conventional jack structures the pneumatic jacks constructed in accordance with the teachings of this invention are fed through a single compressed-air inlet and do not require any resilient return means for, or any permanent supply of fluid on one side of, the movable member.

This invention consists in general in providing pressure-fluid passages between the two sides of the movable member, said passages being arranged to permit, on the side opposite to that subjected to the pneumatic power, the constitution of a kind of "pneumatic spring" adapted to return the movable member with an expansion force which counterbalances or nearly counterbalances itself, in order to maintain this member in its inoperative position under the influence of a relatively low residual pressure, this pneumatic spring re-building itself automatically each time a fresh power application is made to the ram.

According to a preferred embodiment of the device of this invention, in a jack having its rod retracted in the cylinder in the inoperative position, and the compressed air inlet located on the opposite end of the cylinder, means are provided to permit a rapid admission of air toward the end of the piston by providing the piston, for example, with a unilateral sealing packing and there is obtained a slow return of the fluid at the moment of exhaust of the "motor" side of the piston to obtain the pneumatic spring action referred to above, this slow return being made possible, for example, by a duct formed in the packing or by an elastic flap valve on the packing.

In accordance with another embodiment of a jack having its rod retracted in the cylinder in the inoperative position and having a compressed air inlet located on the opposite end of the cylinder, means are provided whereby, during the delivery of compressed air, a slow or retarded supply of compressed air takes place on the side opposite to the rod, this opposite side being provided with means adapted on the one hand to limit the counter-pressure at the end of the stroke and on the other hand to produce a leakage controlled by a resilient valve, so that the device may be caused to effect the positive or outward movement of the movable member, its stoppage in the desired operative position and finally its return stroke to its inoperative position by a pneumatic action obtained by venting or exhausting the pressure-receiving side of the movable member.

In either case, the rod is hollow so as to constitute a reserve chamber adapted to increase the expansion force of the pneumatic return spring.

These arrangements, if compared with conventional and known arrangements wherein one side of the movable member is constantly connected to a separate supply of fluid under pressure, constitute a substantial simplification in the design of jacks and an appreciable increase in their safety or reliability of operation. In fact, with the improved jack design according to this invention, it is not necessary to provide means for permanently connecting the device to the source of compressed air. On the other hand and in this case the jack is not necessarily and always leakproof; now it is well known that the presence of a permanent pressure tends to "stick" the packings; this drawback may even lock the jack, but it is eliminated in the jacks constructed according to this invention, as will be made clear presently.

Similarly, in some other applications, the movable member is returned to its inoperative position by a spring usually mounted in the jack cylinder, but the proper and lasting operation of the device is subordinate to the resistance of this spring. Now springs of this type are subject to corrosion, stresses, and finally break up and cause the cylinder walls to become badly scratched and the packings deteriorated; these drawbacks and the precarious reliability resulting therefrom are also eliminated in the devices constructed in accordance with the teachings of this invention.

In order to afford a clearer understanding of the present invention and of the manner in which the same may be carried out in practice, reference will now be made to the accompanying drawings illustrating diagrammatically by way of example a few typical embodiments thereof.

Figure 1:
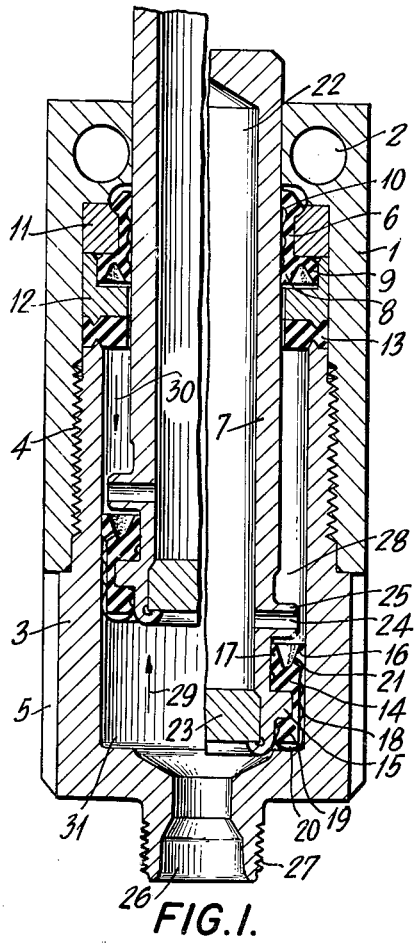
Figure 1 is a longitudinal axial section showing a jack of the type having its rod retracted in the cylinder in the inoperative position, this position being that illustrated in the right-hand half-section whereas the operative position, approximately at mid-stroke, of the rod is shown in the left-hand half section.

Referring first to the embodiment illustrated in Fig. 1, the jack shown therein comprises a body 1, preferably of square cross-section, formed with through holes 2 permitting its fixation by means of bolts (not shown) on a support. A head 3 constituting the jack cylinder is screwed at 4 in the body 1 and tightened by means of a suitable spanner (not shown) engaging longitudinal grooves 5 formed on the outer wall of the head 3. The reference numeral 6 designates a gland packing forming a leak-proof joint between the sliding rod 7 and the jack body at the outlet end thereof.

The gland packing 6 comprises a pair of inner sealing lips 8, 9 and a scraper-lip 10. This packing has a reinforcing support 11 fitted in a recess of the body 1 and clamped against the bottom of this recess by a ring 12 formed with an annular recess accommodating the lips 8, 9, this ring 12 being pressed in turn by the head 3; furthermore, a flat sealing gasket 13 is interposed between the inner edge of the head 3 and the ring 12 to seal the latter relative to the cylinder wall.

The piston solid with the rod 7 consists essentially of a rod packing 14 held in position by a circular rib 15, This packing is of the unidirectional sealing type and comprises a sliding-contact sealing lip 16 and a static sealing lip 17 both extending in the direction of the piston to be sealed; annular beads 18 formed on the outer face of the rod packing 14 are in sliding contact with the cylinder bore, and a shock-absorbing bead 19 is also formed on the packing 14 to engage the bottom of the cylinder when the rod is in its innermost or inoperative position.

Radial notches 20 are formed for a purpose to be explained presently in the shock-absorbing bead 19 and extend across the circular beads 18 up to the root of lip 16. Similarly, the root of lip 16 is perforated as shown at 21, but these perforations are effected without removing the packing material, also for a purpose to be defined presently.

The piston rod 7 is hollow and constitutes a chamber 22 closed by a crimped disk 23 and connected to the jack cylinder on the rod side through holes 24 formed in the flange 25 forming an integral part of the rod. A pipe connection 26 constitutes the inlet for the compressed air and is formed with screw threads 27 adapted to receive a hose or pipe connector (not shown).

As already stated, this jack is of the type having its rod recessed in the cylinder in the inoperative position (see right-hand half section of Fig. 1). It operates as follows:

When the cock, valve or other means controlling the distributor of compressed air is opened, compressed air enters the cylinder through the pipe connection 26 and the piston is moved toward the opposite end of the cylinder. This movement is facilitated by the immediate delivery of compressed air acting directly on substantially all of the piston area due to the provision of the radial notches 20. The compressed air flows through the longitudinal extensions of these notches 20 which are formed in the beads 18 then under the lip 16 which rises and this air fills the annular recess 28 as well as the chamber 22 through the holes 24. At this time the jack is filled completely with compressed air but nevertheless the piston continues its movement due to the differential pressures acting in the direction of the arrow 29 (power stroke) and in the direction of the arrow 30 (reaction).

When the piston has completed its working stroke, the rod flange 25 engages and is damped by the gasket 13, the movable assembly remaining in this position as long as compressed air is delivered to the device. When the air inlet is closed and the jack connected to the exhaust, any air present in the chamber 31 is exhausted immediately. Yet the air under pressure previously introduced into the annular space 28 and stored in the rod chamber 22 will now act as a "pneumatic spring" of which the expansion force, from the very moment the chamber 31 is vented to the atmosphere or otherwise exhausted, will quickly restore the piston to its inoperative position in which it engages the bottom of the cylinder 3.

During this return movement, the air contained in the annular space 28 and rod chamber 22 will expand the orifices 21 formed through the packing 14 and escape slowly through the longitudinal notches 20 and pipe connection 26 at a velocity decreasing with the air pressure. After a certain time all this air will be discharged except that the firmness of the perforations 21 will maintain a certain residual pressure in chambers 22 and 28 which will assist in urging the piston against the bottom of cylinder 3. In fact, as already stated hereinabove, perforations are simply made through the packing material without removing any fraction thereof.

If a fresh delivery of compressed air is made through the pipe connection 26 immediately after the piston has resumed its inoperative position and before the air under pressure in chambers 22 and 28 has been exhausted completely, the movement of the movable member will take place at substantially the same speed as if it had taken place after the expansion of the pneumatic return spring, due to the amply preponderant force exerted in the direction of the arrow 29 throughout the piston area, the reaction or resistant force being actually confined to the action exerted by the air pressure on an area substantially equal to the cross-section of the annular space 28.

Figure 2:
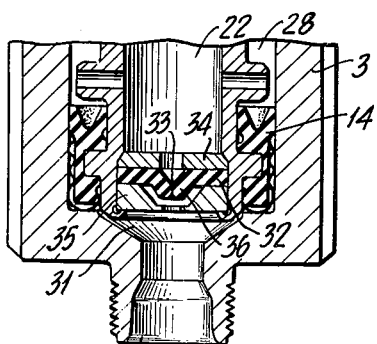
Figure 2 is a fragmentary longitudinal axial section illustrating a modified embodiment of a jack constructed according to the arrangement of Fig. 1.
Figure 5:
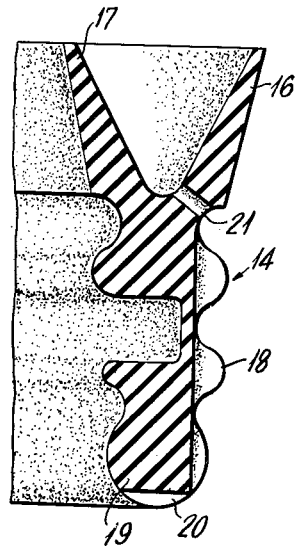
Figure 5 is an enlarged sectional view of the packing shown at the bottom of Fig. 1.

Figure 2 illustrates a different way of causing the pneumatic return spring to expand.

The packing 14 is somewhat the same as that shown in Fig. 1 except that no perforations are made through the root of the sliding contact lip 16 so that no air leak can take place at the level of this packing during the expansion of the pneumatic spring. On the other hand, the inner chamber 22 of the piston rod is closed by a resilient gasket 32 formed with a small central perforation 33, as a substitute for the rigid plug 23 of Fig. 1. This gasket is held in position between a supporting washer 34 and a crimped washer 35. The shape of the central portion 36 of the resilient gasket which surrounds the perforation 33 is such that the fluid can flow only in the direction from chamber 22 to chamber 31; consequently, this gasket acts as a valve member for expanding the pneumatic return spring.

The operation of this jack is substantially the same. When compressed air is delivered through the pipe connection 26 into the jack cylinder, the piston is quickly moved and the compressed air flows as in the preceding examples into the annular space 28 and chamber 22, due to the yielding of the lip 16. When the chamber 31 is vented, the piston is urged toward the bottom of the cylinder 3 by the air pressure existing in chambers 22 and 28 and at the same time this air is gradually exhausted through the perforation 33 which has been opened as a function of the pressure, thereby producing the expansion of the pneumatic return spring, this expansion being attended as in the preceding case by the maintenance of a slight residual pressure stabilizing the movable member of the jack.

It will be readily understood that a jack according to this invention, which is not subject to a permanent pressure when not in use, is definitely leak-proof; on the other hand, as the packings are not urged against the walls by a permanent unidirectional pressure, they are not liable to "stick" thereagainst and the movable member is immediately responsive to the thrust transmitted to the jack when the control cock or valve of the fluid distributor is actuated; finally, when compressed air is fed to the jack the sliding-contact packing lip is balanced and this feature facilitates the return movement of the movable assembly.

Figure 3:
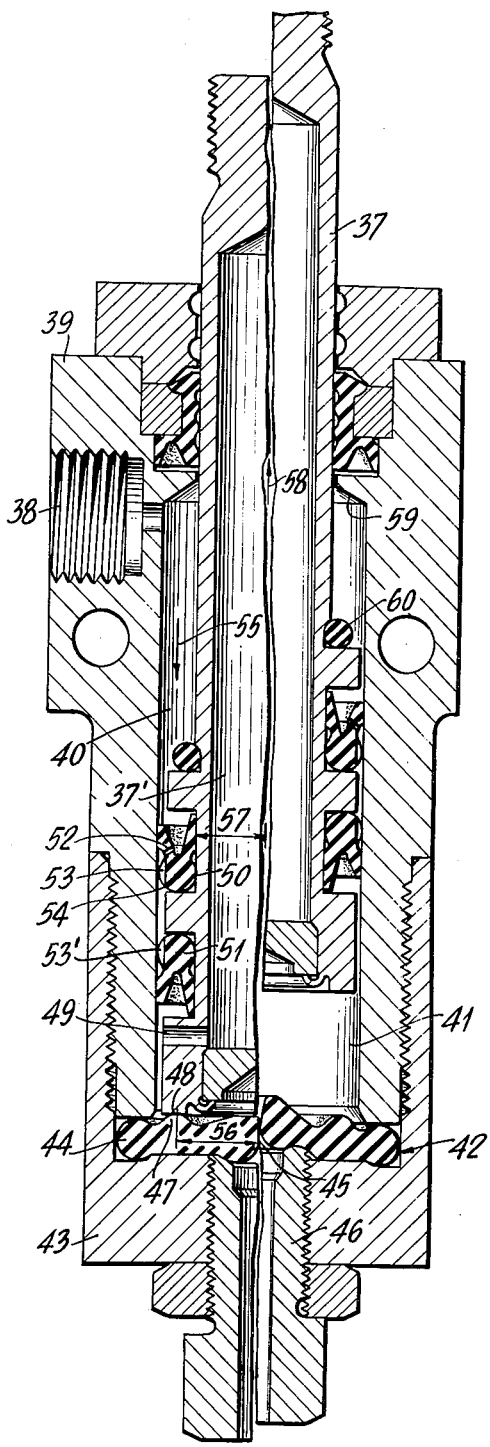
Figure 3 is a longitudinal axial section showing a jack of the type having its rod projecting from the cylinder in the inoperative position, the right-hand half-section illustrating this inoperative position whereas the left-hand half-section shows the rod in its innermost or operative position.

Figure 3 illustrates a modified embodiment of a jack having its rod emerging from the cylinder in its inoperative position, the principle on which the operation of this device is based also consisting in building up a pneumatc return spring upon each jack actuation.

Figure 4:
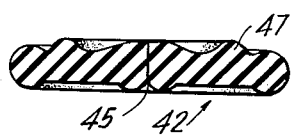
Figure 4 is a diametral section showing the resilient valve diaphragm provided in the jack of Fig. 3.
Figure 6:
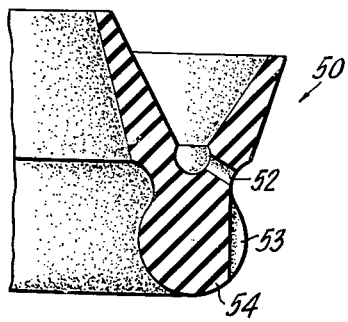
Figure 6 is a similar enlarged sectional view of the packing shown at the center of Fig. 3.
Figure 7:
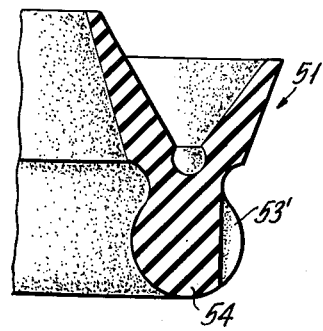
Figure 7 is an enlarged sectional view of the packing shown in the lower portion of Fig. 3.

In this modified embodiment, the jack is operated by delivering compressed air through a pipe connection 38 disposed at one end of the cylinder consisting, in this case, of the body 39 of the device, this cylinder end being that from which emerges the rod 37. In this case, a slow-output passage for the compressed air is provided between the piston side or annular chamber 40 and the opposite piston side or chamber 41, together with means permitting the leakage of air from this chamber 41 through a valve-forming resilient gasket or diaphragm 42. This gasket or diaphragm 42 illustrated separately in Fig. 4, is actually formed with a central perforation 45 obtained without removing any material from the gasket to permit a leakage of fluid from the jack when a pressure of predetermined value, adjustable in this case by means of a screw member 46, is obtained in the chamber 41. This gasket 42 is held in the bottom of the cylinder by the lower annular edge of the screwed head 43 in sealing and clamping engagement with the peripheral annular bead 44 of the gasket. By comparing the half-sections of Fig. 3, it is clear that by altering the axial position of this screw member 46 the firmness of the central perforation 45 can be varied at will; thus, in the unstressed position shown in the left-hand half-section of this figure the orifice 45 will normally resist the escape of air from the chamber 41.

This gasket 42 is also formed with a circular bead 47 adapted to co-act with the piston face 48 when the latter completes its inward stroke, in order to discontinue the air leakage and reduce the effect of the counter-pressure in the chamber 41.

It will be appreciated that in this case too the hollow rod 37 constitutes a chamber 37¹ in permanent communication through the orifices 49 with chamber 41.

The piston is provided with two separate rod packings 50, 51, each formed with an inner and an outer sealing lip. The function of the packing 50 is to seal the joint between the piston and the cylinder wall in the chamber 40 while allowing only a slow or limited flow of compressed air into the chamber 41 through the compulsory passage constituted by the perforations 52 formed in its sliding-contact lip, and subsequently through the longitudinal notches or grooves 53 formed in its toroidal portion or body 54. The function of the other packing 51 is to seal the joint between the piston and the cylinder wall in the camber 41, and its sliding-contact lip may yield to permit the ingress of fluid under pressure from chamber 40 to chamber 41 when compressed air is delivered to chamber 40. This packing 51 is also formed with longitudinal notches or grooves 53¹.

The rod of this jack, as will be made clear presently, normally emerges from the cylinder in the inoperative position of the device; the jack according to this modified embodiment operates as follows:

When compressed air from a distributor (not shown) is delivered through the pipe connection 38 into the annular chamber 40, the movable assembly is driven toward the bottom 43 of the cylinder. The compressed air flowing into the chamber 41 through the orifices 52 as well as the air already existing in this chamber escape through the leakage orifice 45 of valve 42 during this working stroke. Consequently, the resistance encountered by this thrust is relatively moderate and the piston will quickly engage and somewhat crush the bead 47 of the valve-forming gasket 42. From this moment on, the air leakage through the valve 42 is discontinued and the pressure of the compressed air issuing from the chamber 40 is built up on the one hand in the annular portion of chamber 41 formed between the cylinder and piston around the zone of engagement of the piston with the gasket 42 and on the other hand in the chamber 37¹ of rod 37.

From the foregoing, it is clear that the action exerted by the compressed air on the movable assembly is preponderant in the direction of the arrow 55 and takes place with a resultant force equal to the product of the pressure and the annular area between the inner radius 57 and outer radius 56. Thus, if we designate the outer radius 56 as R, the inner radius 57 as $r$ and the pressure as P, when the piston engages against the bead 47 the force which the piston applies in the direction of the arrow 55 against the bottom of the cylinder which communicates with the atmosphere through the orifice 45 will be $P\pi R^2$. The force which acts in the opposite direction, i.e. in the direction of the arrow 58, depends upon the area of the rod 37 of the piston across the bottom of the cylinder and amounts to $P\pi r^2$. From the fact that $R>r$, the resultant force wiill be $P\pi R^2 - P\pi r^2$ or $P\pi(R^2-r^2)$ which corresponds to the above-mentioned resultant force equal to the product of the pressure and the annular area $(\pi[R^2-r^2])$ between the inner radius 57 and the outer radius 56. Thus, the movable assembly will be pressed against the gasket 42 as long as compressed air is delivered through the pipe connection 38. When the operator actuates the control valve or cock of the distributor to vent the chamber 40 of the device to the atmosphere, the compressed air in chamber 37¹ and in the aforesaid annular portion of the chamber 41, by exerting its pressure on the gasket 51, will transmit a thrust to the movable assembly and the latter will move in the direction of the arrow 58. Immediately upon leaving the gasket 42 the piston will allow the compressed air in chambers 37¹ and 41 to continue its expansion so as to jointly push the piston by acting on the entire front surface thereof and gradually escape through the orifice 45 of valve 42, the movable assembly being finally returned to engage the cylinder bottom 59, the shock being absorbed by the resilient gasket 60. As in the preceding examples, the movable assembly remains in this inoperative position under the influence of the residual pressure provided in the chamber 41 proportionally to the firmness of the leakage orifice 45, thus constituting a safety factor in the operation of the device.

Of course, the forms of embodiment described hereinabove and illustrated in the accompanying drawings are merely illustrative of the manner in which the invention may be carried out in the practice and should not be construed as limiting the present invention, as many modifications and alterations can be brought thereto without departing from the spirit and scope of the invention as set forth in the appended claims.

I claim:

1. A differential-pressure pneumatic jack having a movable rod forming a piston reciprocatable in a cylinder and comprising a single air inlet for the delivery of compressed air on a first side of the movable piston to subject said first side to the driving pressure, said rod being formed with a cavity defining a chamber in permanent communication with the side of the piston opposite said first side, a packing of the unidirectional sealing type fixedly mounted on said piston and formed with a passage which permits flow of compressed air to the side of the piston opposite said first side which is subjected to said driving pressure, said jack including a deformable resilient portion and said portion being formed with expansible channel means defining a dilatable orifice which opens in response to a predetermined minimum fluid pressure to create on said opposite side a fluid leakage slower than the air flow upon venting the pressure-receiving side of the piston to the atmosphere, whereby the air introduced to the side opposite the side receiving the driving pressure is adapted to drive the movable rod back to its initial position with a substantially counterbalanced expansion force.

2. A jack as defined in claim 1, wherein the rod is retracted in the cylinder in the inoperative position of the jack and wherein said deformable resilient portion forms part of said packing of the unidirectional sealing type.

3. A jack as defined in claim 1, wherein said piston is provided with a resilient packing formed with a sliding-contact lip providing said deformable resilient portion and permitting the flow of air towards said other side and said expansible channel means consists of at least one perforation formed without removing any packing material in the root of said lip.

4. A jack as defined in claim 1, wherein said deformable resilient portion defines a resilient packing closing the chamber defined in said rod.

5. A jack as defined in claim 1, wherein said jack has the rod emerging from the cylinder in the inoperative position of the jack, the inlet means for delivering compressed air being disposed at the side of said rod and the cylinder bottom opposite the end of said rod being provided with means defining a leakage orifice and a resilient pad having an inwardly-projecting bead surrounding said leakage orifice and being adapted to be engaged by the end of the rod to form a fluid-tight joint therewith, the diameter of said pad being selected to reduce the counter-pressure resisting the rod-driving force and to form an annular chamber between the cylinder wall and the rod wall around said pad, said annular chamber being in permanent communication with a chamber defined by a cavity in said rod.

6. A jack as defined in claim 5, wherein said orifice is formed in the center of said pad.

7. A jack as defined in claim 1, wherein the cylinder bottom opposite said rod is formed with a resilient pad having a central expansible orifice, said orifice being surrounded by a concentric bead coacting with the end of the rod to form a fluid-tight joint when the rod reaches the cylinder bottom, said cylinder bottom being provided with an axially adjustable pipe connection engaging the central portion of said pad to permit adjustment of said expansible orifice.

8. A jack as defined in claim 1, wherein the cylinder bottom opposite said rod is formed with a resilient pad having a central expansible orifice, said orifice being surrounded by a concentric bead coacting with the end of the rod to form a fluid-tight joint when the rod reaches the cylinder bottom, said piston carrying two unidirectional sealing packings each having yielding lips directed toward an end of said piston, the packing on the side of said piston facing the air inlet being provided with at least one orifice to define said means to permit said slow leakage of compressed air toward the other packing.

9. A jack as defined in claim 1, wherein said jack has the rod emerging from the cylinder in the inoperative position of the jack, the inlet means for delivering compressed air being disposed at the side of said cylinder and said deformable resilient portion being disposed in the cylinder bottom opposite the end of said rod and being provided with a resilient pad having an inwardly-projecting bead surrounding said channel being adapted to be engaged by the end of the rod to form a fluid-tight joint therewith, the diameter of said pad being selected to reduce the counter-pressure resisting the rod-driving force and to form an annular chamber between the cylinder wall and the rod wall around said pad, said annular chamber being in permanent communication with said chamber defined by said cavity in said rod.

10. A jack as defined in claim 1, wherein said jack has the rod emerging from the cylinder in the inoperative position of the jack, the inlet means for delivering compressed air being disposed at the side of said cylinder and said deformable resilient portion being disposed in the cylinder bottom opposite the end of said rod and being provided with a resilient part having an inwardly-projecting bead surrounding concentrically said channel which is formed in the center of said pad, said concentric bead coacting with the end of the rod to form a fluid-tight joint when the rod reaches the cylinder bottom, and said cylinder bottom being provided with an axially adjustable pipe connection engaging the central portion of said pad to permit adjustment of said expansible channel.

11. A jack as defined in claim 1, wherein said jack has the rod emerging from the cylinder in the inoperative position of the jack, the inlet means for delivering compressed air being disposed at the side of said cylinder and said deformable resilient portion being disposed in the cylinder bottom opposite the end of said rod and being provided with a resilient part having an inwardly-projecting bead surrounding concentrically said channel which is formed in the center of said pad, said concentric bead coacting with the end of the rod to form a fluid-tight joint when the rod reaches the cylinder bottom, said cylinder bottom being provided with an axially adjustable pipe connection engaging the central portion of said pad to permit adjustment of said expansible channel, and said piston carrying two undirectional sealing packings each having yielding lips directed toward an end of said piston, with packing on the side of said piston facing the air inlet being provided with at least one orifice to define means to permit slow leakage of compressed air toward the other packing.

References Cited in the file of this patent

UNITED STATES PATENTS

| Number | Name | Date |
|---|---|---|
| 204,914 | Prince | June 18, 1878 |
| 1,005,190 | Furlow | Oct. 10, 1911 |
| 2,703,558 | Wilcox | Mar. 8, 1955 |
| 2,713,850 | Bradbury et al. | July 26, 1955 |
| 2,906,377 | Peras | Sept. 29, 1959 |

FOREIGN PATENTS

| Number | Country | Date |
|---|---|---|
| 544,196 | Italy | June 6, 1956 |